US010966013B2

(12) United States Patent  
He (10) Patent No.: US 10,966,013 B2  
(45) Date of Patent: Mar. 30, 2021

(54) ROTARY BRACKET METHOD FOR ASSEMBLING THE ROTARY BRACKET AND HEADPHONE

(71) Applicant: SHENZHEN QIANHAI PATUOXUN NETWORK AND TECHNOLOGY CO., LTD, Shenzhen (CN)

(72) Inventor: Yanan He, Shenzhen (CN)

(73) Assignee: SHENZHEN QIANHAI PATUOXUN NETWORK AND TECHNOLOGY CO., LTD, Shenzhen (CN)

(*) Notice: Subject to any disclaimer, the term of this patent is extended or adjusted under 35 U.S.C. 154(b) by 49 days.

(21) Appl. No.: 16/660,839

(22) Filed: Oct. 23, 2019

(65) Prior Publication Data

US 2021/0051390 A1 Feb. 18, 2021

Related U.S. Application Data

(63) Continuation of application No. PCT/CN2019/100992, filed on Aug. 16, 2019.

(51) Int. Cl.  
*H04R 25/00* (2006.01)  
*H04R 1/10* (2006.01)  
*F16C 11/04* (2006.01)

(52) U.S. Cl.  
CPC ............ *H04R 1/1066* (2013.01); *F16C 11/04* (2013.01); *H04R 1/105* (2013.01); *H04R 1/1008* (2013.01)

(58) Field of Classification Search  
CPC ...... H04R 5/0335; H04R 1/10; H04R 1/1008; H04R 1/1041; H04R 1/1066  
See application file for complete search history.

(56) References Cited

U.S. PATENT DOCUMENTS 10,681,461 B2 * 6/2020 Fukushima .......... H04R 5/0335  
2011/0103635 A1 * 5/2011 Asakura ............... H04R 1/1066  
381/378

* cited by examiner

Primary Examiner — Amir H Etesam (57) ABSTRACT

A rotary bracket that comprises a first bracket, a second bracket, a fixing piece, and a rotary connecting piece, wherein the fixing piece comprises a fixing body, the transfer end of the first bracket is rotatably connected with the rotary connecting piece, the plug end of the second bracket penetrates through the insertion interface and is fixed in the mounting cavity.

20 Claims, 8 Drawing Sheets

ROTARY BRACKET METHOD FOR ASSEMBLING THE ROTARY BRACKET AND HEADPHONE

CROSS-REFERENCE TO RELATED APPLICATIONS

This application claims the benefit of PCT patent application No. PCT/CN2019/100992 filed on Aug. 16, 2019 and is incorporated by reference in its entirety.

BACKGROUND

Technical Field

The present disclosure relates to the technical field of headphone, and particularly relates to a rotary bracket, method for assembling the rotary bracket, and headphone.

Background

Current headphones comprise a rotary bracket and two headphone bodies mounted at two ends of the rotary bracket, wherein the rotary bracket comprises a headband and two support arms connected to two ends of the headband, where each headphone bodies is respectively mounted on one of the support arms. To facilitate storage of the headphone, the headband and each support arms are usually rotatably connected through a rotating shaft. And the headband and the support arms are both interference-fitted with the rotating shaft, the position of headphone is controlled by the friction generated between the support arms, headphone bodies, and the rotating shaft, so that the support arm can drive the headphone body together to turn to the headband. When there is a need to use the headphone, each support arms simply turn away from the headband. For example, U.S. patent application Ser. No. 14/899,021, entitled "Headphone", discloses a headphone in which the support arms of the headphone are rotatably connected to the ends of the headband of the headphone through a rotating shaft for unfolding and folding. However, such a rotating connection structure has a large space occupancy rate; and whether it is in a folded state or an unfolded state, the rotating shaft can be seen, which affects the overall aesthetics. Most importantly, the headband and each support arms are tightly connected with the rotating shaft, which causes the rotating connecting structure to be inconvenient to be loaded and unloaded, and also causes great damage to the appearance of the product due to the close cooperation during the loading and unloading process.

SUMMARY

The present disclosure provides a rotary bracket, method for assembling the rotary bracket, and headphone, and aims to solve the technical problems that the rotary connecting structure on the rotary bracket takes up a large space and affects the overall appearance. Moreover, in the process of loading and unloading, due to the close cooperation, it will cause great damage to the appearance of the rotating bracket.

In order to solve the above technical problems, the technical solution adopted by the present disclosure is as follows: the present application provides a rotary bracket, comprising: a first bracket, a second bracket, a fixing piece and a rotary connecting piece, wherein the fixing piece comprises a fixing body, and the fixing body has a first connecting end and a second connecting end opposite to the first connecting end; the fixing body also has a mounting cavity, a plug interface and a transfer interface, wherein the plug interface and the transfer interface are communicated with the mounting cavity: the transfer interface is disposed at the first connecting end and extends from the first connecting end to an upper sidewall of the fixing body, and the plug interface is disposed at the second connecting end;

the first bracket has a transfer end, where the transfer end is rotatably connected with the rotary connecting piece, the rotary connecting piece penetrates through the transfer interface and is positioned in the mounting cavity, and the transfer end penetrates through the transfer interface and is inserted into the mounting cavity;

the second bracket has a plug end, and the plug end penetrates through the plug interface and is fixed in the mounting cavity;

the first bracket has an unfolded state when the transfer end of the first bracket is turned to the first connecting end; the first bracket has a folded state when the transfer end of the first bracket is turned to an upper side of the fixing body along with the transfer interface.

The object of the present disclosure also provides a method for assembling a rotary bracket, comprising:

preparing a rotary bracket: preparing a rotary bracket, wherein the rotary bracket comprises a first bracket, a second bracket, a fixing piece and a rotary connecting piece, wherein the fixing piece comprises a fixing body, and the fixing body has a first connecting end and a second connecting end opposite to the first connecting end; the fixing body also has a mounting cavity, a plug interface and a transfer interlace, wherein the plug interface and the transfer interface are communicated with the mounting cavity; the transfer interface is disposed at the first connecting end and extends from the first connecting end to an upper sidewall of the fixing body, and the plug interface is disposed at the second connecting end; the first bracket has a transfer end; the second bracket has a plug end;

first assembling: rotating the transfer end of the first bracket with the rotary connecting piece;

first rotational adjusting: rotating the first bracket upwards by a certain angle relative to the rotary connecting piece;

second assembling: passing the rotary connecting piece of the first bracket through the transfer interface and limiting the rotary connecting piece to the mounting cavity, and passing the transfer end through the transfer interface and inserting the transfer end into the mounting cavity;

second rotational adjusting: rotating the transfer end of the first bracket to the first connecting end of the fixing body, so that the first bracket has an unfolded state;

third assembling: passing the plug end of the second bracket through the plug interface, when the transfer end of the first bracket is rotated to a side part of the fixing body along with the transfer interface, the first bracket has a folded state;

fixing: fixing the plug end with the fixing body.

The object of the present disclosure also provides a headphone, comprises the above rotary bracket.

Beneficial effects of the present disclosure: the present disclosure provides a rotary bracket, method for assembling the rotary bracket, and headphone with the rotary bracket, the rotary bracket comprises a first bracket, a second bracket, a fixing piece and a rotary connecting piece, the transfer end of the first bracket is rotatably connected with the rotary connecting piece, the rotary connecting piece penetrates through the transfer interface and is positioned in the mounting cavity, at the same time, the transfer end of the first bracket penetrates through the interface and is inserted into the mounting cavity; the transfer interface is an opening formed in the fixing body by the first connecting end openings to an upper sidewall. The transfer end of the first bracket is rotatable along the extending direction of the transfer interface; the plug end of the second bracket penetrates through the insertion interface and is fixed in the mounting cavity; the first bracket has an unfolded state when the transfer end of the first bracket is turned to the first connecting end; the first bracket has a folded state when the transfer end of the first bracket is turned to an upper side of the fixing body along with the transfer interface. Therefore, the design of the rotary bracket eliminates the direct connection between the first bracket and the second bracket through the rotating shaft, and facilitates the assembly of the first bracket and the second bracket by the addition of the rotary connecting piece and the fixing piece. When assembling, simply rotate the rotary connecting piece to the transfer end of the first bracket; then, pass the rotary connecting piece through the transfer interface and limit the rotary connecting piece to the mounting cavity of the fixing piece; finally, pass the plug end of the second bracket through the plug interface and limit the plug end to the mounting cavity, and fix the plug end to the fixing piece to finish the assembly of the rotary bracket; when disassembling, simply reverse the assembly steps. Therefore, on the one hand, the rotary structure assembled is hidden in the mounting cavity, and the overall aesthetics of the rotary bracket is improved; on the other hand, the first bracket and the rotary connecting piece are separately assembled and disassembled, so that the appearance of the first bracket and the second bracket cannot be damaged; further, the overall structure is simple, the transfer structure is compact and takes up little space, which improves the user experience.

DETAILED DESCRIPTION OF THE EMBODIMENTS

To make the objects, technical solutions and advantages of the present invention more comprehensible, the present invention will be further described in detail below regarding the accompanying drawings and embodiments. It should be understood that the specific embodiments described herein are merely illustrative of the invention and are not intended to limit the invention. It should be noted that when an element is referred to as being "fixed" or "disposed" on another element, it can be directly fixed or disposed on the other element or it can be indirectly fixed or disposed on the other element through a third component. When an element is referred to as being "connected" to another element, it can be directly connected to the other element or it can be indirectly connected to the other element through a third component.

It is to be understood that the terms "length, width, upper, lower, front, rear, left, right, vertical, horizontal, top, bottom, inner, outer", and the like, refer to orientations or positional relationships based on the orientations or positional relationships shown in the figures. It is intended merely to facilitate a description of the present invention and to simplify the description, rather than to indicate or imply that a device or element referred to must have a particular orientation, be constructed and operated in a particular orientation, and thus should not be construed as limiting the present invention.

Furthermore, the terms "first" and "second" are used for descriptive purposes only and are not to be construed as indicating or implying relative importance or implicitly indicating the number of technical features indicated. Thus, features defining "first" and "second" may explicitly or implicitly include one or more such features. In the description of the present invention, "a plurality" means two or more unless specifically defined otherwise.

Embodiment 1

Referring to FIG. 1 to FIG. 4, an embodiment of the present disclosure provides a rotary bracket that comprises a first bracket 100, a second bracket 200, a fixing piece 300 and a rotary connecting piece 400, wherein the fixing piece 300 comprises a fixing body 310, and the fixing body 310 has a first connecting end 311 and a second connecting end 312 opposite to the first connecting end 311; the fixing body 310 also has a mounting cavity 301, a plug interface 302 and a transfer interface 303, wherein the plug interface 302 and the transfer interface 303 are communicated with the mounting cavity 301. The transfer interface 303 is disposed at the first connecting end 311 and extends from the first connecting end 311 to an upper sidewall of the fixing body 310, and the plug interface 302 is disposed at the second connecting end 312.

The first bracket 100 has a transfer end 110, where the transfer end 110 is rotatably connected with the rotary connecting piece 400, the rotary connecting piece 400 penetrates through the transfer interface 303 and is positioned in the mounting cavity 301, and the transfer end 110 penetrates through the transfer interface 303 and is inserted into the mounting cavity 301. It can be understood that the transfer end 110 of the first bracket 100 is rotatably connected with the rotary connecting piece 400, and the rotary connecting piece 400 is installed in the mounting cavity 301 by the transfer interface 303 and is limited to the mounting cavity 301. At the same time, the transfer end 110 of the first bracket 100 penetrates through the transfer interface 303 and is inserted into the mounting cavity 301. The transfer interface 303 is an opening formed in the fixing body 310 by the first connecting end 311 openings to an upper sidewall. The transfer end 110 of the first bracket 100 is rotatable along the extending direction of the transfer interface 303. The second bracket 200 has a plug end 210, and the plug end 210 penetrates through the plug interface 302 and is fixed in the mounting cavity 301.

The first bracket 100 has an unfolded state when the transfer end 110 of the first bracket 100 is turned to the first connecting end 311. The first bracket 100 has a folded state when the transfer end 110 of the first bracket 100 is turned to an upper side of the fixing body 310 along with the transfer interface 303.

In one embodiment, the rotary bracket 1 comprises a first bracket 100, a second bracket 200, a fixing piece 300 and a rotary connecting piece 400. The transfer end 110 of the first bracket 100 is rotatably connected with the rotary connecting piece 400, the rotary connecting piece 400 penetrates through the transfer interface 303 and is positioned in the mounting cavity 301. At the same time, the transfer end 110 of the first bracket 100 penetrates through the transfer interface 303 and is inserted into the mounting cavity 301. The transfer interface 303 is an opening formed in the fixing body 310 by the first connecting end 311 openings to an upper sidewall. The transfer end 110 of the first bracket 100 is rotatable along the extending direction of the transfer interface 303. The plug end 210 of the second bracket 200 penetrates through the plug interface 302 and is fixed in the mounting cavity 301. The first bracket 100 has an unfolded state when the transfer end 110 of the first bracket 100 is turned to the first connecting end 311. The first bracket 100 has a folded state when the transfer end 110 of the first bracket 100 is turned to an upper side of the fixing body 310 along with the transfer interface 303. Therefore, the design of the rotary bracket 1 eliminates the direct connection between the first bracket 100 and the second bracket 200 through the rotating shaft, and facilitates the assembly of the first bracket 100 and the second bracket 200 by the addition of the rotary connecting piece 400 and the fixing piece 300. When assembling, simply rotate the rotary connecting piece 400 to the transfer end 110 of the first bracket 100. Then, pass the rotary connecting piece 400 through the transfer interface 303 and limiting the rotary connecting piece 400 to the mounting cavity 301 of the fixing piece 300. Finally, pass the plug end 210 of the second bracket 200 through the plug interface 302 and limit the plug end 210 to the mounting cavity 301, and fix the plug end 210 to the fixing piece 300 to finish the assembly of the rotary bracket 1. When disassembling, simply reverse the assembly steps. Therefore, on the one hand, the rotary structure assembled is hidden in the mounting cavity 301, and the overall aesthetics of the rotary bracket 1 is improved; on the other hand, the first bracket 100 and the rotary connecting piece 400 are separately assembled and disassembled, so that the appearance of the first bracket 100 and the second bracket 200 cannot be damaged; further, the overall structure is simple, the transfer structure is compact and takes up little space, which improves the user experience.

In one embodiment, the fixing body 310 has connecting holes 304 respectively on two sides of an end surface of the first connecting end 311, and each connecting holes 304 is communicated with the mounting cavity 301. Two sides of an insertion end surface of the plug end 210 of the second bracket 200 have fixing holes 201. When the plug end 210 is inserted into the mounting cavity 301, each of the connecting holes 304 corresponds to a fixing hole 201, and one end portion of a connecting member is externally passed through the connecting hole 304 and locked in the corresponding fixing hole 201, to finish the fixed connection between the plug end 210 and the fixing piece 300.

Figure 1:
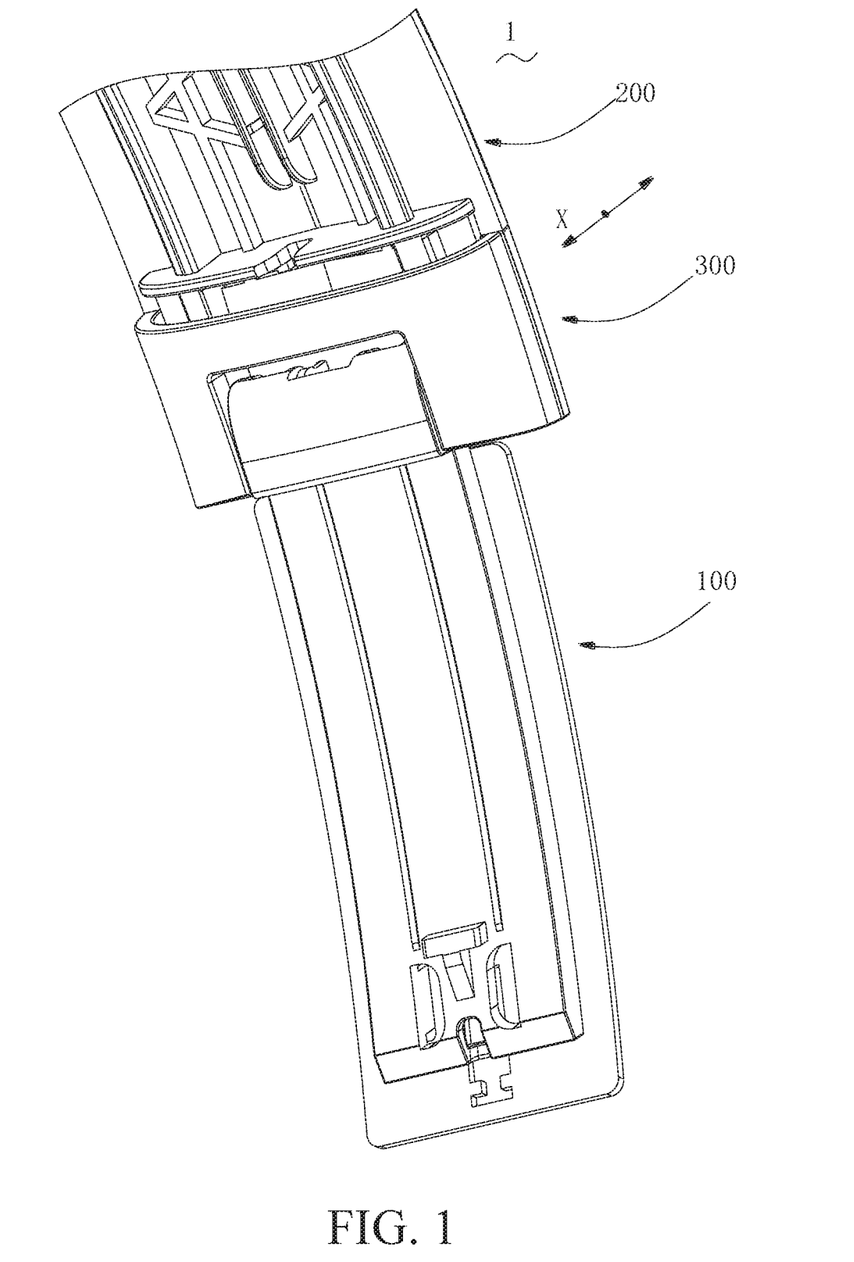
FIG. 1 is a perspective assembly view of a rotary bracket according to an embodiment of the present disclosure.
Figure 2:
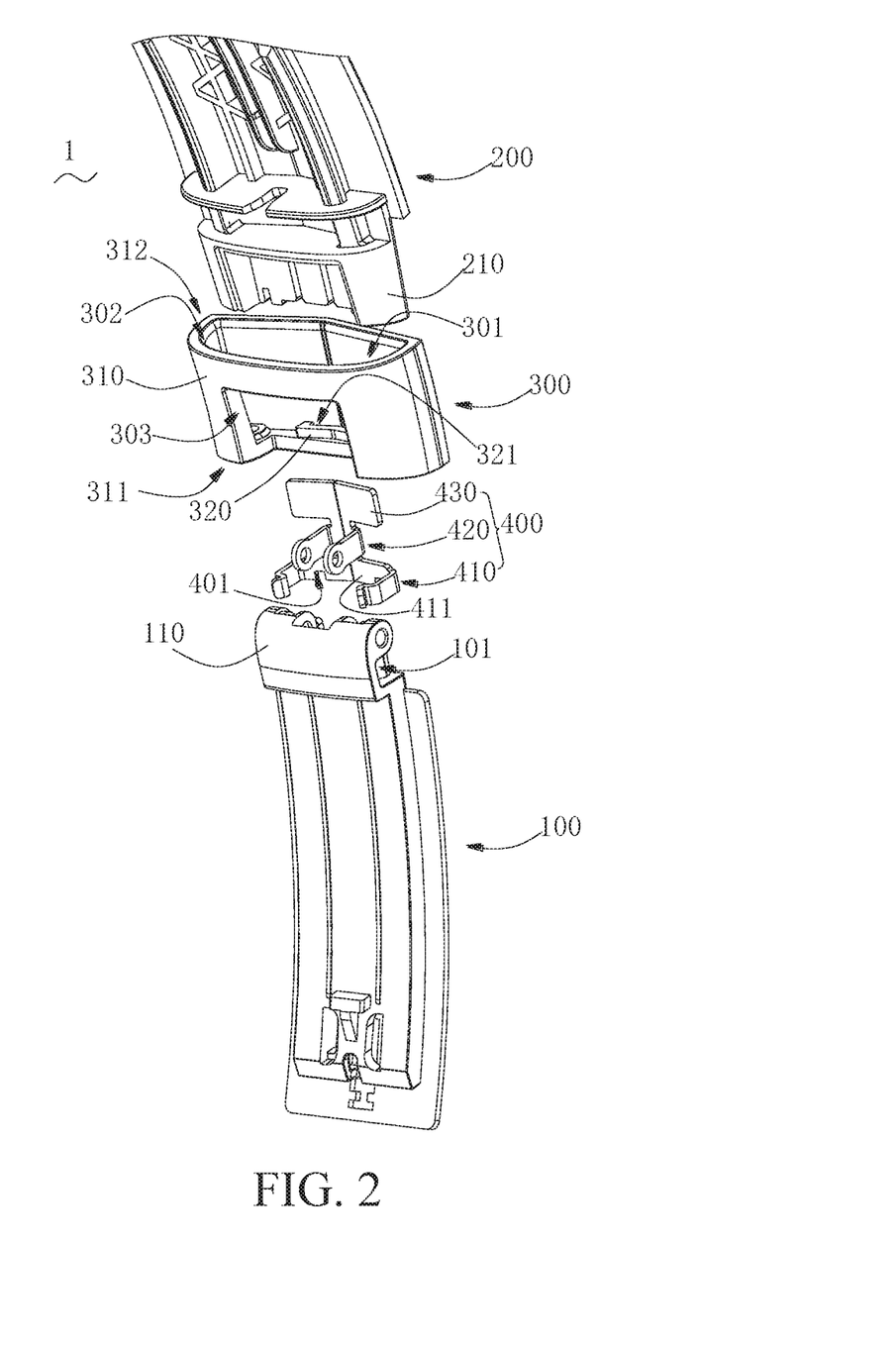
FIG. 2 is an exploded perspective view of the rotary bracket according to an embodiment of the present disclosure.
Figure 3:
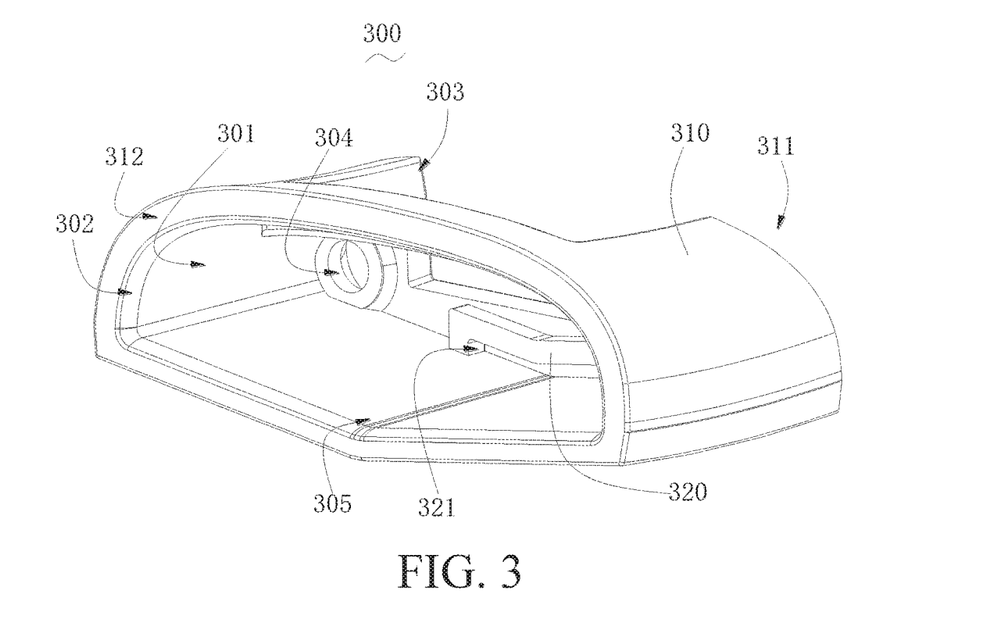
FIG. 3 is a perspective view of a fixing piece according to an embodiment of the present disclosure.

Referring to FIG. 1 to FIG. 2, further, the rotary connecting piece 400 comprises a first limiting part 410, a transfer part 420 and a second limiting part 430, which are sequentially butted together. The transfer end 110 of the first bracket 100 is rotatably connected with the transfer part 420. The first limiting part 410 and the second limiting part 430 are both located in the mounting cavity 301.

Figure 5:
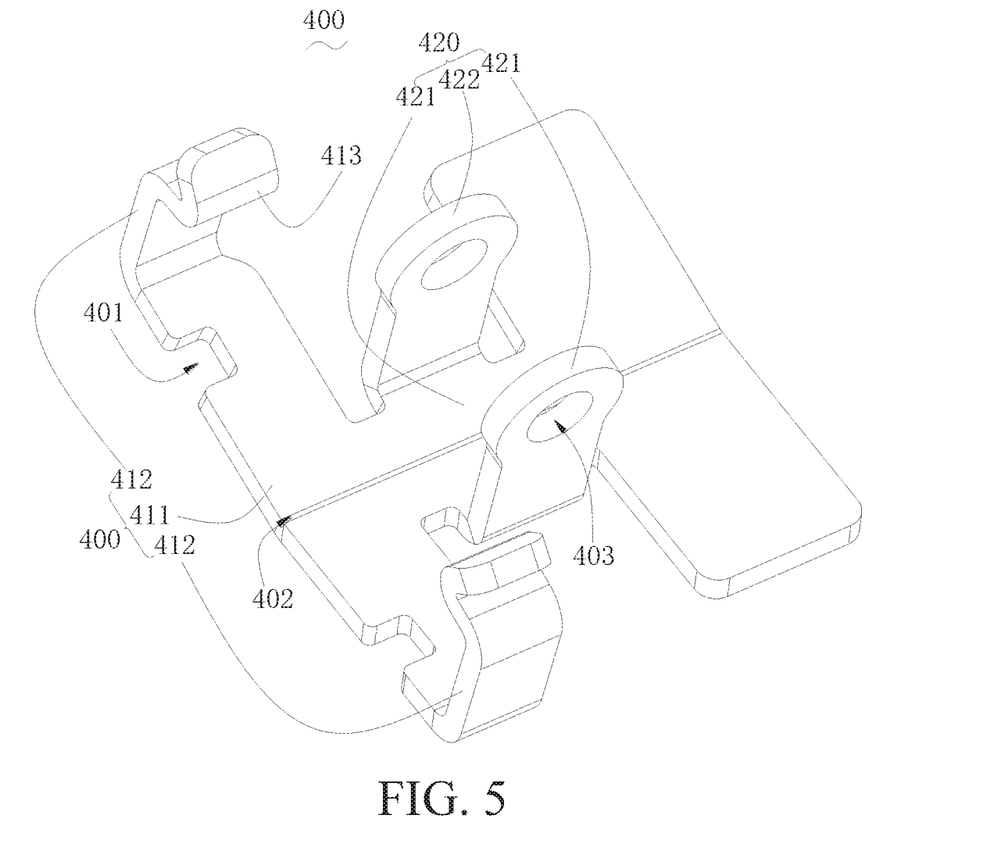
FIG. 5 is a perspective view of a rotary connecting piece according to an embodiment of the present disclosure.

Referring to FIG. 2 and FIG. 5, further, the fixing piece 300 further comprises a limiting platform 320 protruded from a cavity wall of the mounting cavity 301. The limiting platform 320 is disposed adjacent to the first connecting end 311. The limiting platform 320 has a limiting groove 321 on the surface of the limiting platform 320, and a notch of the limiting groove 321 faces the second connecting end 312.

The first limiting part 410 comprises a limiting inserting plate 411, a first end of the limiting inserting plate 411 is connected with the transfer part 420, and a second end of the limiting inserting plate 411 is inserted into the limiting groove 321. In this way, the limit inserting plate 411 is effectively prevented from being displaced toward the transfer interface 303 and the first connecting end 311.

In one embodiment, the limiting inserting plate 411 has two inserting slots 401 at the edge of the board opposite to the first connecting end 311. A board between the two inserting slots 401 is inserted into the limiting groove 321, and two end faces of the limiting platform 320 are respectively inserted into the two inserting slots 401.

Figure 6:
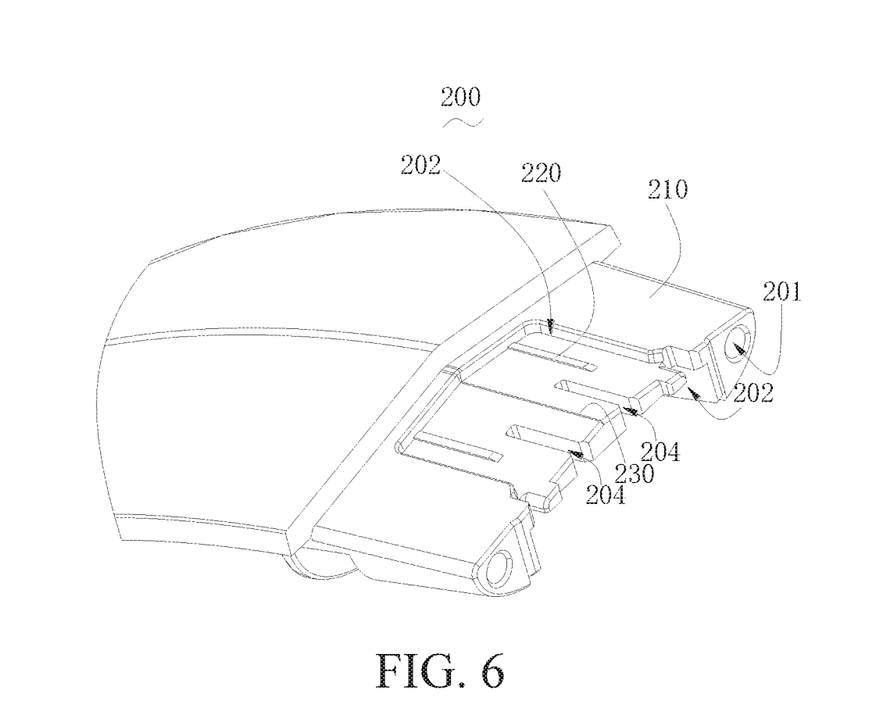
FIG. 6 is a partial perspective view of a second angle of the second bracket according to an embodiment of the present disclosure.

Referring to FIG. 2 and FIG. 6, further, a lower surface of the plug end 210 of the second bracket 200 has a restraining groove 202 extending to the plug end 210, and the second limiting part 430 is inserted into the restraining groove 202. It can be understood, the rotary connecting piece is mounted on the mounting cavity 301 of the fixed body 310. At this time, an upper surface of the second limiting party 430 and an upper cavity wall of the mounting cavity 301 of the fixing body 310 form a docking space. The plug end 210 of the second bracket 200 is inserted into the docking space through the plug interface 302. The second limiting party 430 is gradually inserted into the restraining groove 202 while the plug end 210 is gradually inserted into the mounting cavity 301. When the second limiting party 430 abuts against an end wall of the restraining groove 202, the plug end 210 of the second bracket 200 is fixed to the fixing body 310. Thus, in conjunction with the arrangement of the limiting groove 321, the restriction of the rotary connecting piece 400 is completed, that is, the fixing of the rotary connecting piece 400 is completed.

In one embodiment, the plug end 210 has at least two support bars 220 protruding from the bottom of the restraining groove 202. The at least two support bars 220 are spaced apart from each other, and extend along an inserting direction in which the second limiting party 430 is inserted into the restraining groove 202. Thus, the contact area of the second limiting party 430 with the groove bottom of the restraining groove 202 is lowered, and the wear of the overall structure can be reduced. Specifically, an end face of an inserting end of the support bar 220 has a guiding slope, so that the second limiting party 430 can be smoothly and quickly inserted in place. In one embodiment, the second limiting party 430 is a limiting plate.

Figure 4:
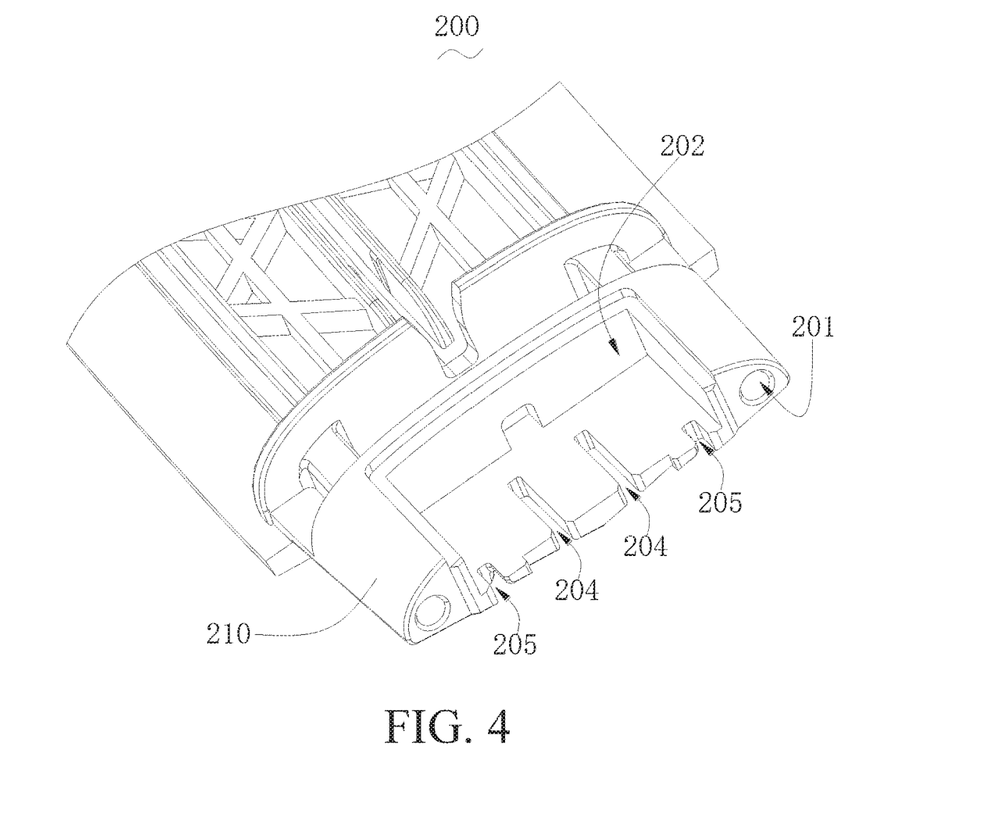
FIG. 4 is a partial perspective view of a second bracket according to an embodiment of the present disclosure.

Referring to FIG. 2, FIG. 4 and FIG. 6, further, an upper surface of the plug end 210 of the second bracket 200 has a containing groove 203, and the plug end 210 is inserted into the containing groove 203. In this way, the overall structure of the rotary bracket 1 can be more compact.

Referring to FIG. 2, FIG. 4 and FIG. 6, further, an end surface of the plug end 210 of the second bracket 200 has a relief groove 204, the relief groove 204 is vertically penetrated, and the transfer part 420 is inserted into the relief groove 204. In this way, the space occupied by the transfer structure of the rotary bracket 1 is further reduced, and the structure is more compact.

Referring to FIG. 2, FIG. 4 and FIG. 5, further, the transfer part 420 comprises a bridging plate 421, that connects the first limiting part 410 and the second limiting part 430 at two ends respectively, and two transfer legs 422 formed by extending upwards from opposite sides of the bridging plate 421. The two transfer legs 422 are rotatably connected with the transfer end 110 through a rotating shaft (Not shown in the figure). In one embodiment, two relief grooves 204 have two and are spaced apart from each other. Each transfer legs 422 is respectively inserted into a relief groove 204, and a free end part of each transfer legs 422 are respectively passed through the corresponding relief groove 204 and are rotatably connected with the transfer end 110 through the rotating shaft. Specifically, both ends of the bridging plate 421 are respectively connected to one end of the limiting, plate and one end of the limiting inserting plate 411. The bridging plate 421, limiting plate and the limiting inserting plate 411 together form a support plate.

Referring to FIG. 1 and FIG. 5, further, the first limiting part 410 further comprises two limiting legs 412 formed by upwardly extending from two opposite sides of the limiting inserting plate 411, and the two limiting legs 412 respectively have opposite clamping protrusions 413 at their free end ends. In one embodiment, free ends of the two limiting legs 412 are recessed toward each other to form the clamping protrusions 413.

The two sides of the transfer end 110 have clamping grooves respectively.

In one embodiment, when the first bracket 100 is in the unfolded state, each of the clamping protrusions 413 is respectively inserted into one of the clamping groove 101, and the first bracket 100 is restrained, so that the first bracket 100 is in an unfolded state relative to the second bracket 200. When the first bracket 100 is in a rotating process, each of the clamping protrusions 413 is respectively abutted on a side of the transfer end 110, and the two limiting legs 412 cooperate to clamp the transfer end 110. Thus, when the first bracket 100 rotates relative to the second bracket 200, the first bracket 100 is clamped by the two limiting legs 412 to generate a certain frictional force during the rotation, so that the rotational force (externally applied force) of the first bracket 100 when rotating relative to the second bracket 200 can be made uniform. When the first bracket 100 is in the folded state, the two limiting legs 412 are folded towards each other and abutted on a bottom surface of the first bracket 100. The first bracket 100 is restrained, so that the first bracket 100 is kept folded relative to the second bracket 200.

Figure 7:
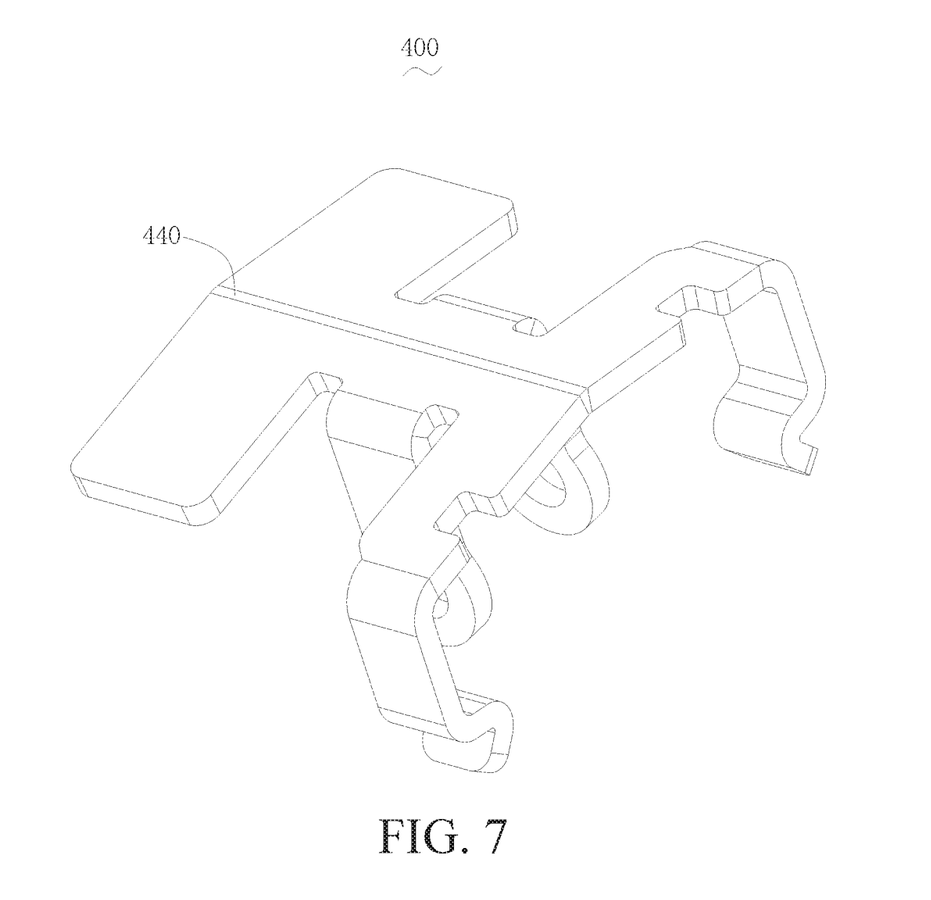
FIG. 7 is a perspective view of a second angle of a rotary connecting piece according to an embodiment of the present disclosure.

Referring to FIG. 2 FIG. 5 and FIG. 7, further, the fixing body 310 has a guiding groove 305 along the insertion direction of the plug end 210 on a lower cavity wall of the fixing body 310, a lower surface of the rotary connecting piece 400 has a guiding protrusion 440 matching the guiding groove 305. And the guiding protrusion 440 is inserted into the guiding groove 305 and is slidably matched with the guiding groove 305. In this way, it is convenient to position the rotary connecting piece 400 in place. In one embodiment, the guiding groove 305 is a V-shaped, of course, it is not limited thereto, may be a U-shaped, as long as the rotary connecting piece 400 can be positioned and installed. Specifically, the support plate of the rotary connecting piece 400 is recessed downward to form the guiding protrusion 440, and the upper portion of the support plate forms a leading groove 402.

In one embodiment, the plug end 210 of the second bracket 200 has a leading protrusion 230 at the groove bottom of the restraining groove 202. And the leading protrusion 230 is matched with the leading groove 402 of the rotary connecting piece 400. In this way, the plug end 210 can be quickly and accurately installed in place, and assembly efficiency can be improved.

Figure 8:
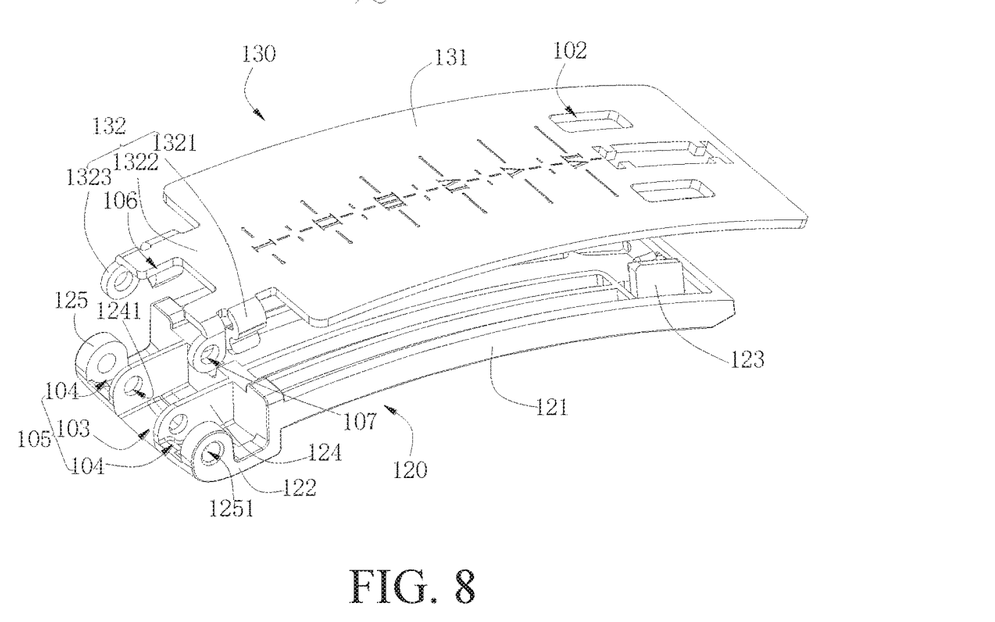
FIG. 8 is an exploded perspective view of a first bracket according to an embodiment of the present disclosure.

Referring to FIG. 2 and FIG. 8, further, the first bracket 100 comprises a mainframe body 120 and a support bracket 130, the mainframe body 120 comprises a plate body 121 and a conversion adapter 122 connected to one end of the plate body 121, the support bracket 130 comprises a carrier plate 131 and a clamping adapter 132 connected to one end of the carrier plate 131; the clamping adapter 132 is fixed on the conversion adapter 122 and forms the transfer end 110 together with the clamping adapter 132; the carrier plate 131 is positioned below the plate body 121 and laminated with the plate body 121, and the carrier plate 131 is detachably connected with the plate body 121; the rotary connecting piece 400 is rotatably connected with the conversion adapter 122. In one embodiment, the carrier plate 131 is fastened with the plate body 121, the mainframe body 120 further comprises at least one clamping hook 123 connected with a lower surface of the plate body 121, each of clamping hooks 123 is located at an end of the plate body 121 opposite to the conversion adapter 122, correspondingly, the carrier plate 131 has at least one clamping hole 102, and each of clamping hooks 123 passes through a clamping hole 102 and fastens to a lower plate surface of the carrier plate 131.

Referring to FIG. 2, FIG. 4, FIG. 5, and FIG. 8, further, a lower surface of the conversion adapter 122 has an inserting groove 103 and two fastening grooves 104, and the two fastening grooves 104 are respectively disposed on two sides of the inserting groove 103; the inserting groove 103 extends to an end face of an insertion end of the conversion adapter 122. Each of the fastening groove 104 extends to a side face of the conversion adapter 122, and the rotary connecting piece 400 is inserted into the inserting groove 103 and rotationally connected with the conversion adapter 122;

the clamping adapter 132 respectively extends two elastic clamping legs 1321 on two sides thereof in the direction of the corresponding fastening groove 104. The rotary connecting piece 400 is connected with each of the elastic clamping legs 1321 when the first bracket 100 is in the unfolded state, and the rotary connecting piece 400 is disconnected with each of the elastic clamping legs 1321 when the first bracket 100 is in the folded state.

In one embodiment, the conversion adapter 122 has a receiving groove 105 communicating with transfer end 110 and both sides of the conversion adapter 122. The mainframe body 120 further comprises two adapter plates 124 connected to the groove wall of the receiving groove 105, wherein the two adapter plates 124 are parallel to each other and stand at the groove bottom of the receiving groove 105. At the same time, the two adapter plates 124 divide the receiving groove 105 into one inserting groove 103 and two fastening grooves 104, wherein the inserting groove 103 is located between the two adapter plates 124. Each adapter plates 124 has a rotating hole 1241, and each of the transfer legs 422 of the rotary connecting piece 400 has an adapter hole 403 at the free end part thereof. The two transfer legs 422 are inserted into the inserting groove 103. And the two adapter holes 403 are communicated with the two rotating holes 1241 and are sequentially connected in series through the rotating shaft to realize the rotational connection between the rotary connecting piece 400 and the conversion adapter 122.

In one embodiment, the clamping adapter 132 comprises a main plate 1322 and two elastic clamping legs 1321 extending upwards from two sides of the main plate 1322, wherein the cross-sections of the elastic clamping legs 1321 are in an S-shaped, and end parts of the elastic clamping legs 1321 are respectively inserted into one fastening groove 104. And a deformation gap is formed for elastic deformation of the elastic clamping legs 1321 between the elastic clamping legs 1321 and the corresponding adapter plate 124. The opposite surfaces of the free ends of the two elastic clamping legs 1321 form the clamping grooves 101, and the clamping protrusions 413 of the limiting legs 412 are respectively inserted into the clamping grooves 101 of one elastic clamping leg 1321, so that the first bracket 100 is maintained in an unfolded state. When the clamping protrusions 413 of each of the limiting legs 412 is disengaged from the clamping groove 101 by the external force, the clamping protrusions 413 slide along the S-shaped curved surface of the elastic clamping leg 1321, and at the same time, the two limiting legs 412 jointly clamp the two elastic clamping legs 1321 until the two limiting legs 412 abut against the lower surface of the main plate 1322, and the first bracket 100 maintained in a folded state. When unfolding is required, it only needs to apply a certain external force to squeeze the two limiting legs 412 and slide along the S-shaped curved surface of each elastic clamping legs 1321, and finally engage with the clamping grooves 101.

In one embodiment, an end of the main plate 1322 has a U-shaped groove 106, and the U-shaped groove 106 communicates with the insertion groove 103 to prevent the two limiting legs 412 from interfering with the main plate 1322 when the first bracket 100 is in the unfolded state.

In one embodiment, the clamping adapter 132 further comprises two fixing plates 1323 extending upward from the two sides of the main plate 1322. Free ends of each of the fixing plates 1323 have a penetrating hole 107, and the free ends of the fixing plates 1323 are respectively inserted into one fastening groove 104. And the penetrating holes 107 respectively correspond to the rotating holes 1241 of the adapter plate 124, and the penetrating holes 107 respectively also communicate with the rotating holes 1241 of the adapter plate 124. The two penetrating holes 107 and the two adapter holes 403 communicate with the two rotating holes 1241 and are sequentially threaded through the rotating shaft to realize the fixing of the clamping adapter 132, and also realize the rotational connection between the rotary connecting piece 400 and the conversion adapter 122, and improve the stability of the transfer structure.

In one embodiment, the mainframe body 120 further comprises two transfer bodies 125 respectively formed by the bottoms of the two fastening grooves 104 extending downward. The fixing plate 1323 is inserted between the transfer body 125 and the adapter plate 124. Each of the transfer bodies 125 has a through hole 1251 at a free end thereof. The two through holes 1251, the two penetrating holes 107, the two adapter holes 403, and the two rotating holes 1241 communicate with each other and are sequentially connected through the rotating shaft, so that the rotary connecting piece 400 and the conversion adapter 122 are rotatably connected, and further improve the stability of the rotation.

In one embodiment, the plug end 210 of the second bracket 200 has two avoiding grooves 205 at a first end surface thereof facing a second end face. These two avoiding grooves 205 are vertically penetrated, and the limiting legs 412 are respectively inserted into an avoiding groove 205. In this way, the space occupied by the adapter structure of the rotating bracket 1 is better reduced, and the structure is more compact.

In one embodiment, the rotary connecting piece 400 is formed by stamping.

Embodiment 2

Figure 9:
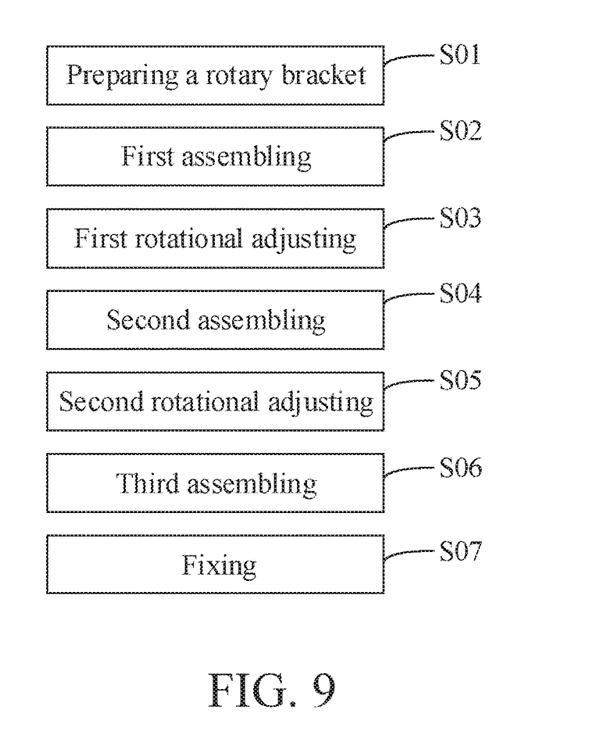
FIG. 9 is a flow chart of a method of assembling a rotary bracket according to an embodiment of the present disclosure.
Figure 10:
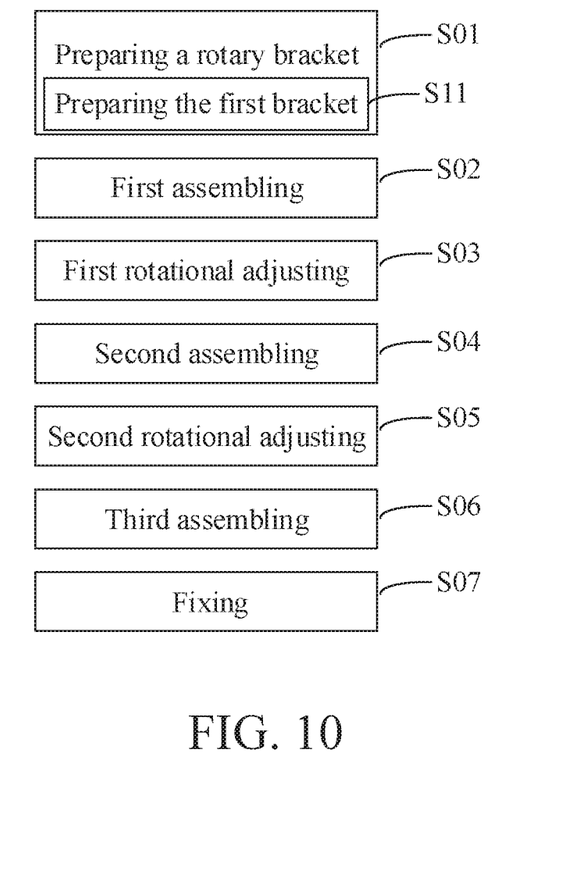
FIG. 10 is a detailed flowchart of an assembling method of the rotary bracket according to an embodiment of the present disclosure.

Referring to FIG. 9 and FIG. 1 to FIG. 8 in embodiment 1, an embodiment of the present disclosure provides a method for assembling a rotary bracket, comprising:

S01: preparing a rotary bracket 1: preparing a rotary bracket 1, wherein the rotary bracket 1 comprises a first bracket 100, a second bracket 200, a fixing piece 300 and a rotary connecting piece 400, wherein the fixing piece 300 comprises a fixing body 310, and the fixing body 310 has a first connecting end 311 and a second connecting end 312 opposite to the first connecting end 311; the fixing body 310 also has a mounting cavity 301, a plug interface 302 and a transfer interface 303, wherein the plug interface 302 and the transfer interface 303 are communicated with the mounting cavity 301. The transfer interface 303 is disposed at the first connecting end 311 and extends from the first connecting end 311 to an upper sidewall of the fixing piece 300, and the plug interface 302 is disposed at the second connecting end 312; the first bracket 100 has a transfer end 110; the second bracket 200 has a plug end 210.

The fixing piece 300 further comprises a limiting platform 320 protruded from a cavity wall of the mounting cavity 301, the limiting platform 320 is disposed adjacent to the first connecting end 311, the limiting platform 320 has a limiting groove 321 on the surface thereof, and a notch of the liming groove 321 faces the second connecting end 312.

The rotary connecting piece 400 comprises a first limiting part 410, a second limiting part 430, and a transfer part 420 that connects the first limiting part 410 and the second limiting part 430 to the two ends respectively. The first limiting part 410 comprises a limiting inserting plate 411. A lower surface of the plug end 210 of the second bracket 200 has a restraining groove 202 extending to the end face thereof.

In step S01, the method further comprises:

S11: prepare the first bracket 100. Preparing the first bracket 100, the first bracket 100 comprises a mainframe body 120 and a support frame 130, the mainframe body 120 comprises a plate body 121 and a conversion adapter 122 connected to one end of the plate body 121, the support frame 130 comprises a carrier plate 131 and a clamping adapter 132 connected to one end of the carrier plate 131; fixing the clamping adapter 132 and the conversion adapter 122, and the clamping adapter 132 and the clamping adapter 132 together form the transfer end 110. Laminating the carrier plate 131 under the plate body 121, and the carrier plate 131 is detachably connected with the plate body 121.

S02: first assembling: rotating the transfer end 110 of the first bracket 100 with the rotary connecting piece 400.

Specifically, rotating the transfer end 110 of the first bracket 100 with the transfer part 420.

S03: First rotational adjusting: rotating the first bracket 100 upwards by a certain angle relative to the rotary connecting piece 400. Thus, the rotary connecting piece 400 on which the first bracket 100 is mounted is passed through the transfer interface 303 and mounted in the mounting cavity 301.

S04: second assembling: passing the rotary connecting piece 400 of the first bracket 100 through the transfer interface 303 and limiting the rotary connecting piece 400 to the mounting cavity 301. And passing the transfer end 110 through the transfer interface 303 and inserting the transfer end into the mounting cavity 301.

Specifically, inserting a second end of the limiting inserting plate 411 into the limiting groove 321. In this way, the limit inserting plate 411 is effectively prevented from being displaced toward the transfer interface 303 and the first connecting end 311.

S05: second rotational adjusting: rotating the transfer end 110 of the first bracket 100 to the first connecting end 311 of the fix body 310, so that the first bracket 100 has an unfolded state.

S06: third assembling: passing the plug end 210 of the second bracket 200 through the plug interface 302, when the transfer end 110 of the first bracket 100 is rotated to a side part of the fixing body 310 along with the transfer interface 303, the first bracket 100 has a folded state.

Specifically, aligning the plug end 210 with the plug interface 302 and inserting the plug end 210 between the second limiting part 430 and the upper cavity wall of the mounting cavity 301. Inserting the second limiting part 430 into the restraining groove 202. Thus, in conjunction with step 04, the restriction of the rotary connecting piece 400 is achieved.

S07: fixing: fixing the plug end 210 with the fixing body 310.

In one embodiment, in the first step, preparing the rotary bracket 1, wherein the rotary bracket 1 comprises the first bracket 100, the second bracket 200, the fixing piece 300 and the rotary connecting piece 400; in the second step, rotating the transfer end 110 of the first bracket 100 with the rotary connecting piece 400; in the third step, rotating the first bracket 100 upwards by a certain angle relative to the rotary connecting piece 400 to facilitate the next steps; in the fourth step, passing the rotary connecting piece 400 of the first bracket 100 through the transfer interface 303 and limiting the rotary connecting piece 400 to the mounting cavity 301, and passing the transfer end 110 through the transfer interface 303 and inserting the transfer end 110 into the mounting cavity 301, the transfer interface 303 is an opening formed in the fixing body 310 by the first connecting end 311 openings to an upper sidewall, and the transfer end 110 of the first bracket 100 is rotatable along the extending direction of the transfer interface 303; in the fifth step, rotating the transfer end 110 of the first bracket 100 to the first connecting end 311 of the fixing body 310 to facilitate the next steps; in the sixth step, passing the plug end 210 of the second bracket 200 through the plug interface 302; in the seventh step, fixing the plug end 210 with the fixing body 310 to complete the assembly. The first bracket 100 has an unfolded state when the transfer end 110 of the first bracket 100 is turned to the first connecting end 311; the first bracket 100 has a folded state when the transfer end 110 of the first bracket 100 is turned to an upper side of the fixing body 310 along with the transfer interface 303. Therefore, the design of the rotary bracket 1 eliminates the direct connection between the first bracket 100 and the second bracket 200 through the rotating shaft, and facilitates the assembly of the first bracket 100 and the second bracket 200 by the addition of the rotary connecting piece 400 and the fixing piece 300. When assembling, simply rotate the rotary connecting piece 400 to the transfer end 110 of the first bracket 100. Then, pass the rotary connecting piece 400 through the transfer interface 303 and limiting the rotary connecting piece 400 to the mounting cavity 301 of the fixing piece 300. Finally, pass the plug end 210 of the second bracket 200 through the plug interface 302 and limit the plug end 210 to the mounting cavity 301, and fix the plug end 210 to the fixing piece 300 to finish the assembly of the rotary bracket 1. When disassembling, simply reverse the assembly steps. Therefore, on the one hand, the rotary structure assembled is hidden in the mounting cavity 301, and the overall aesthetics of the rotary bracket 1 is improved; on the other hand, the first bracket 100 and the rotary connecting piece 400 are separately assembled and disassembled, so that the appearance of the first bracket 100 and the second bracket 200 cannot be damaged; further, the overall structure is simple, the transfer structure is compact and takes up little space, which improves the user experience.

In this embodiment, the specific structure of the rotating bracket 1 has been described in the embodiment 1, and details are not described herein again.

Embodiment 3

Referring to FIG. 1, a third embodiment of the present disclosure provides a headphone comprising the rotating bracket 1 as described above.

In one embodiment, the rotary bracket 1 is applied to the headphone, and the advantages thereof are:

First, it is convenient for the storage of headphones.

Second, since the rotating structure of the rotating bracket 1 is hidden after being assembled, the overall appearance of the headphone is improved.

Third, when assembling and disassembling, it will not cause damage to the shape of the headphone.

Fourth, the overall structure of the headphone is simple, the transfer structure is compact, the occupied space is small, the wearing is comfortable, and the user experience is improved.

In one embodiment, the end portion of the first bracket 100 corresponding to the transfer end 110 is connected to the headphone.

The above is merely a preferred embodiment of the present disclosure, and is not intended to limit the present disclosure. Any modifications, equivalent substitutions, and improvements made within the spirit and principles of the present disclosure are included within the scope of the claims of the present disclosure.

What is claimed is:

1. A rotary bracket, comprising: a first bracket, a second bracket, a fixing piece, and a rotary connecting piece,
wherein the fixing piece comprises a fixing body, and the fixing body has a first connecting end and a second connecting end opposite to the first connecting end; the fixing body also has a mounting cavity, a plug interface and a transfer interface, wherein the plug interface and the transfer interface are communicated with the mounting cavity; the transfer interface is disposed at the first connecting end and extends from the first connecting end to an upper sidewall of the fixing body, and the plug interface is disposed at the second connecting end;
the first bracket has a transfer end, where the transfer end is rotatably connected with the rotary connecting piece, the rotary connecting piece penetrates through the transfer interface and is positioned in the mounting cavity, and the transfer end penetrates through the transfer interface and is inserted into the mounting cavity;

the second bracket has a plug end, and the plug end penetrates through the plug interface and is fixed in the mounting cavity;

the first bracket has an unfolded state when the transfer end of the first bracket is turned to the first connecting end; the first bracket has a folded state when the transfer end of the first bracket is turned to an upper side of the fixing body along with the transfer interface.

2. The rotary bracket according to claim 1, wherein the fixing piece further comprises a limiting platform protruded from a cavity wall of the mounting cavity, the limiting platform is disposed adjacent to the first connecting end, the limiting platform has a limiting groove on the surface thereof, and a notch of the limiting groove faces the second connecting end;

the rotary connecting piece comprises a first limiting part and a transfer part connected with the first limiting part, the transfer end of the first bracket is rotatably connected with the transfer part;

the first limiting part comprises a limiting inserting plate, a first end of the limiting inserting plate is connected with the transfer part, and a second end of the limiting inserting plate is inserted into the limiting groove.

3. The rotary bracket according to claim 2, wherein the first limiting part further comprises two limiting legs formed by upwardly extending from two opposite sides of the limiting inserting plate, and the two limiting legs respectively have opposite clamping protrusions at their free ends;

the transfer end has clamping grooves on two sides thereof;

when the first bracket is in the unfolded state, each of the clamping protrusions is respectively inserted into a clamping groove; when the first bracket is in a rotating process, each of the clamping protrusions is respectively abutted on a side of the transfer end, and the two limiting legs cooperate to clamp the transfer end; and when the first bracket is in the folded state, the two limiting legs are folded towards each other and abutted on a bottom surface of the first bracket.

4. The rotary bracket according to claim 2, wherein the rotary connecting piece further comprises a second limiting part connected with the transfer part, the first limiting part and the second limiting part are respectively disposed at two ends of the transfer part, a lower surface of the plug end of the second bracket has a restraining groove extending to the plug end, and the second limiting part is inserted into the restraining groove.

5. The rotary bracket according to claim 4, wherein an upper surface of the plug end of the second bracket has a containing groove, and the plug end is inserted into the containing groove.

6. The rotary bracket according to claim 2, wherein an end surface of the plug end of the second bracket has a relief groove, and the relief groove is vertically penetrated; the transfer part is inserted into the relief groove.

7. The rotary bracket according to claim 4, wherein the transfer part comprises a bridging plate, that connects the first limiting part and the second limiting part at two ends respectively, and two transfer legs formed by extending upwards from opposite sides of the bridging plate;

and two transfer legs are rotatably connected with the transfer end through a rotating shaft.

8. The rotary bracket according to claim 2, wherein the fixing body has a guiding groove along the insertion direction of the plug end on a lower cavity wall of the fixing body, a lower surface of the rotary connecting piece has a guiding protrusion matching the guiding groove, and the guiding protrusion is inserted into the guiding groove and is slidably matched with the guiding groove.

9. The rotary bracket according to claim 1, wherein the first bracket comprises a mainframe body and a support frame, the mainframe body comprises a plate body and a conversion adapter connected to one end of the plate body, the support frame comprises a carrier plate and a clamping adapter connected to one end of the carrier plate; the clamping adapter is fixed on the conversion adapter and forms the transfer end together with the clamping adapter; the carrier plate is positioned below the plate body and laminated with the plate body, and the carrier plate is detachably connected with the plate body; the rotary connecting piece is rotatably connected with the conversion adapter.

10. The rotary bracket according to claim 9, wherein a lower surface of the conversion adapter has an inserting groove and two clamping grooves, and the two clamping grooves are respectively disposed on two sides of the inserting groove; the inserting groove extends to an end face of an inserting end of the conversion adapter; each of the clamping grooves extends to a side face of the conversion adapter, and the rotary connecting piece is inserted into the inserting groove and rotationally connected with the insertion adapter;

the clamping adapter respectively extends two elastic clamping legs on two sides thereof in the direction of the corresponding clamping groove; the rotary connecting piece is connected with each of the elastic clamping legs when the first bracket is in the unfolded state, and the rotary connecting piece is disconnected with each of the elastic clamping legs when the first bracket is in the folded state.

11. A method for assembling a rotary bracket, comprising:
preparing a rotary bracket: preparing a rotary bracket, wherein the rotary bracket comprises a first bracket, a second bracket, a fixing piece and a rotary connecting piece, wherein the fixing piece comprises a fixing body, and the fixing body has a first connecting end and a second connecting end opposite to the first connecting end; the fixing body also has a mounting cavity, a plug interface and a transfer interface, wherein the plug interface and the transfer interface are communicated with the mounting cavity; the transfer interface is disposed at the first connecting end and extends from the first connecting end to an upper sidewall of the fixing body, and the plug interface is disposed at the second connecting end; the first bracket has a transfer end; the second bracket has a plug end;

first assembling: rotating the transfer end of the first bracket with the rotary connecting piece;

first rotational adjusting: rotating the first bracket upwards by a certain angle relative to the rotary connecting piece;

second assembling: passing the rotary connecting piece of the first bracket through the transfer interface and limiting the rotary connecting piece to the mounting cavity, and passing the transfer end through the transfer interface and inserting the transfer end into the mounting cavity;

second rotational adjusting: rotating the transfer end of the first bracket to the first connecting end of the fixing body, so that the first bracket has an unfolded state;

third assembling: passing the plug end of the second bracket through the plug interface, when the transfer end of the first bracket is rotated to a side part of the fixing body along with the transfer interface, the first bracket has a folded state;

fixing: fixing the plug end with the fixing body.

12. The method for assembling the rotary bracket according to claim 11, wherein in the step of preparing the rotating bracket, further comprising preparing the first bracket, the first bracket comprises a mainframe body and a support frame, the mainframe body comprises a plate body and a conversion adapter connected to one end of the plate body, the support frame comprises a carrier plate and a clamping adapter connected to one end of the carrier plate; fixing the clamping adapter and the conversion adapter, and the conversion adapter and the clamping adapter together form the transfer end; laminating the carrier plate under the plate body, and the carrier plate is detachably connected with the plate body.

13. The method for assembling the rotary bracket according to claim 11, wherein the fixing piece further comprises a limiting platform protruded from a cavity wall of the mounting cavity, disposing the limiting platform adjacent to the first connecting end, forming a limiting groove on the surface of the limiting platform, and a notch of the limiting groove faces the second connecting end;

the rotary connecting piece comprises a first limiting part and a transfer part connected with the first limiting part, the first limiting, part comprises a limiting inserting plate, a first end of the limiting inserting plate is connected with the transfer part;

in the step of first assembling, connecting the transfer end of the first bracket with the transfer part rotatably;

in the step of second assembling, inserting a second end of the limiting inserting plate into the limiting groove.

14. The method for assembling the rotary bracket according to claim 13, wherein the rotary connecting piece further comprises a second limiting part connected with the transfer part, the first limiting part and the second limiting part are disposed at two ends of the transfer part, forming a restraining groove extending to the plug end on a lower surface of the plug end of the second bracket;

In the step of third assembling, aligning the plug end with the plug interface, and inserting the plug end between the second limiting part and an upper cavity wall of the mounting cavity, and inserting the second limiting part into the limiting groove.

15. A headphone, comprising a rotary bracket, wherein the rotary bracket comprising: a first bracket, a second bracket, a fixing piece, and a rotary connecting piece, wherein the fixing piece comprises a fixing body, and the fixing body has a first connecting end and a second connecting end opposite to the first connecting end; the fixing body also has a mounting cavity, a plug interface and a transfer interface, wherein the plug interface and the transfer interface are communicated with the mounting cavity; the transfer interface is disposed at the first connecting end and extends from the first connecting end to an upper sidewall of the fixing body, and the plug interface is disposed at the second connecting end;

the first bracket has a transfer end, where the transfer end is rotatably connected with the rotary connecting piece, the rotary connecting piece penetrates through the transfer interface and is positioned in the mounting cavity, and the transfer end penetrates through the transfer interface and is inserted into the mounting cavity;

the second bracket has a plug end, and the plug end penetrates through the plug interlace and is fixed in the mounting cavity;

the first bracket has an unfolded state when the transfer end of the first bracket is turned to the first connecting end; the first bracket has a folded state when the transfer end of the first bracket is turned to an upper side of the fixing body along with the transfer interface.

16. The headphone according to claim 15, wherein the fixing piece further comprises a limiting platform protruded from a cavity wall of the mounting cavity, the limiting platform is disposed adjacent to the first connecting end, the limiting platform has a limiting groove on the surface thereof, and a notch of the limiting groove faces the second connecting end;

the rotary connecting piece comprises a first limiting part and a transfer part connected with the first limiting part, the transfer end of the first bracket is rotatably connected with the transfer part;

the first limiting part comprises a limiting inserting plate, a first end of the limiting inserting plate is connected with the transfer part, and a second end of the limiting inserting plate is inserted into the limiting groove.

17. The headphone according to claim 16, wherein the first limiting part further comprises two limiting legs formed by upwardly extending from two opposite sides of the limiting inserting plate, and the two limiting legs respectively have opposite clamping protrusions at their free ends;

the transfer end has clamping grooves on two sides thereof;

when the first bracket is in the unfolded state, each of the clamping protrusions is respectively inserted into a clamping groove; when the first bracket is in a rotating process, each of the clamping protrusions is respectively abutted on a side of the transfer end, and the two limiting legs cooperate to clamp the transfer end; and when the first bracket is in the folded state, the two limiting legs are folded towards each other and abutted on a bottom surface of the first bracket.

18. The headphone according to claim 16, wherein the rotary connecting piece further comprises a second limiting part connected with the transfer part, the first limiting part and the second limiting part are respectively disposed at two ends of the transfer part, a lower surface of the plug end of the second bracket has a restraining groove extending to the plug end, and the second limiting part is inserted into the restraining groove; an upper surface of the plug end of the second bracket has a containing groove, and the plug end is inserted into the containing groove; an end surface of the plug end of the second bracket has a relief groove, and the relief groove is vertically penetrated; the transfer part is inserted into the relief groove.

19. The headphone according to claim 18, wherein the transfer part comprises a bridging plate, that connects the first limiting part and the second limiting part at two ends respectively, and two transfer legs formed by extending upwards from opposite sides of the bridging plate;

and two transfer legs are rotatably connected with the transfer end through a rotating shaft;

the fixing body has a guiding groove along the insertion direction of the plug end on a lower cavity wall of the fixing body, a lower surface of the rotary connecting piece has a guiding protrusion matching the guiding groove, and the guiding protrusion is inserted into the guiding groove and is slidably matched with the guiding groove.

20. The headphone according to claim 15, wherein the first bracket comprises a mainframe body and a support frame, the mainframe body comprises a plate body and a conversion adapter connected to one end of the plate body, the support frame comprises a carrier plate and a clamping adapter connected to one end of the carrier plate; the clamping adapter is fixed on the conversion adapter and forms the transfer end together with the clamping adapter; the carrier plate is positioned below the plate body and laminated with the plate body, and the carrier plate is detachably connected with the plate body; the rotary connecting piece is rotatably connected with the conversion adapter;

> a lower surface of the conversion adapter has an inserting groove and two clamping grooves, and the two clamping grooves are respectively disposed on two sides of the inserting groove; the inserting groove extends to an end face of an inserting end of the conversion adapter; each of the clamping grooves extends to a side face of the conversion adapter, and the rotary connecting piece is inserted into the inserting groove and rotationally connected with the insertion adapter;
> 
> the clamping adapter respectively extends two elastic clamping legs on two sides thereof in the direction of the corresponding clamping groove; the rotary connecting piece is connected with each of the elastic clamping legs when the first bracket is in the unfolded state, and the rotary connecting piece is disconnected with each of the elastic clamping legs when the first bracket is in the folded state.

\* \* \* \* \*